(12) United States Patent
Baek et al.

(10) Patent No.: US 9,042,544 B2
(45) Date of Patent: May 26, 2015

(54) APPARATUS AND METHOD FOR GENERATING SECRET KEY USING CHANGE IN WIRELESS CHANNEL ON WIRELESS COMMUNICATION NETWORK

(75) Inventors: Seon-Yeob Baek, Daejeon (KR);
Sang-Kyung Yoo, Daejeon (KR); Seok Ryu, Daejeon (KR); Sang-Han Lee, Daejeon (KR); Jang-Hong Yoon, Daejeon (KR)

(73) Assignee: Electronics And Telecommunicatons Research Institute, Daejeon (KR)

( * ) Notice: Subject to any disclaimer, the term of this patent is extended or adjusted under 35 U.S.C. 154(b) by 221 days.

(21) Appl. No.: 13/602,225

(22) Filed: Sep. 3, 2012

(65) Prior Publication Data
US 2013/0156181 A1    Jun. 20, 2013

(30) Foreign Application Priority Data
Dec. 14, 2011    (KR) ........................ 10-2011-0134857

(51) Int. Cl.
*H04W 12/04*    (2009.01)
*H04L 9/08*    (2006.01)
*H04W 4/06*    (2009.01)

(52) U.S. Cl.
CPC .................................. *H04L 9/0875* (2013.01)

(58) Field of Classification Search
CPC .................................................. H04W 12/04
See application file for complete search history.

(56) References Cited

U.S. PATENT DOCUMENTS

| 2005/0123138 A1 | 6/2005 | Abe et al. |
| 2006/0193298 A1 | 8/2006 | Kishigami et al. |
| 2007/0009102 A1 | 1/2007 | Gong et al. |
| 2008/0069251 A1 | 3/2008 | Imai et al. |
| 2008/0304658 A1 | 12/2008 | Yuda et al. |
| 2009/0028262 A1 | 1/2009 | Imai et al. |

(Continued)

FOREIGN PATENT DOCUMENTS

| CN | 1993923 A | 7/2007 |
| JP | 2003-273856 A | 9/2003 |
| JP | 2004-032679 A | 1/2004 |

(Continued)

OTHER PUBLICATIONS

On the Effectiveness of Secret Key Extraction from Wireless Signal Strength in Real Environments. Jana et al. ACM(2009).*

(Continued)

*Primary Examiner* — Venkat Perungavoor
(74) *Attorney, Agent, or Firm* — LRK Patent Law Firm

(57) ABSTRACT

A secret key generation apparatus and method are provided. The secret key generation apparatus includes at least one antenna, amplification/phase controllers, a transceiver, and a random signal controller. The antenna receives a wireless signal from a counterpart terminal that performs wireless communication. The amplification/phase controllers control the amplification gain and phase of the wireless signal that is received via at least one antenna. The transceiver measures the status of a wireless channel using the wireless signal having the controlled amplification gain and phase, determines parameters based on results of the measurement, and generates a secret key based on results of the determination. The random signal controller controls the amplification/phase controllers so that the amplification gain and phase are adjusted whenever the transceiver generates a secret key.

5 Claims, 7 Drawing Sheets

(56) References Cited

U.S. PATENT DOCUMENTS

2009/0279700 A1* 11/2009 Ye et al. .................. 380/270
2012/0281834 A1 11/2012 Reznik et al.

FOREIGN PATENT DOCUMENTS

| JP | 2005-065242 A | 3/2005 |
|----|---------------|--------|
| JP | 2008-532348 A | 8/2008 |
| KR | 10-2007-0096059 A | 10/2007 |
| KR | 10-2009-0124679 A | 12/2009 |
| KR | 10-2011-0014640 A | 2/2011 |
| KR | 10-2011-0073563 A | 6/2011 |
| WO | 2006/011345 A1 | 2/2006 |
| WO | 2006/013798 A1 | 2/2006 |
| WO | 2006/081306 A2 | 8/2006 |
| WO | 2009/145392 A1 | 12/2009 |

OTHER PUBLICATIONS

Fast and Scalable Secret Key Generation Exploiting Channel Phase Randonmess in Wireless Networks. Wang et al. IEEE(2011).*
Secret Key Generation Exploiting Channel Characteristics in Wireless Communications. Ren et al. IEEE(2011).*
Akito Kitaura et al., "A Secret Key Agreement Scheme with Interference Avoidance for MIMO Systems," Journal of IEICE Technical Report, 2011.
Yoshihiko Ogawa et al., "A Scheme of Secret Key Agreement Based on Change of Eigenvalue of Channel Matrix in MIMO-OFDM Systems with the Phase-Controlled on the Transmitted and Received Side," Journal of IEICE Transactions on Communications, 2005.
Kai Zeng et al., "Exploiting Multiple-Antenna Diversity for Shared Secret Key Generation in Wireless Networks," IEEE INFOCOM, 2010.

* cited by examiner

APPARATUS AND METHOD FOR GENERATING SECRET KEY USING CHANGE IN WIRELESS CHANNEL ON WIRELESS COMMUNICATION NETWORK

CROSS REFERENCE TO RELATED APPLICATION

This application claims the benefit of Korean Patent Application No. 10-2011-0134857, filed on Dec. 14, 2011, which is hereby incorporated by reference in its entirety into this application.

BACKGROUND OF THE INVENTION

1. Technical Field

The present invention relates generally to an apparatus and method for generating a secret key using a change in a wireless channel on a wireless communication network and, more particularly, to an apparatus and method for generating a secret key using a change in a wireless channel on a wireless communication network, which change the phase and amplification gain of a wireless channel regardless of the rate of change in the wireless channel, transmit and receive signals, and generate a secret key based on a received signal.

2. Description of the Related Art

Recently, many encryption techniques have been applied to and used in wireless communication systems. These encryption techniques are problematic in that they have been configured to make computation difficult rather than making the acquisition of a key mathematically impossible, in order to prevent infiltration. Once the computational ability of an infiltrator has increased, the effect of this method is reduced. Accordingly, there is a need fir technology that cons lets an encryption technique that provides an absolute rather than technology that is based on the assumption of computational difficulty.

Furthermore, a centralized secret key distribution method chiefly used in encryption technology is not suitable for an Ad-hoc or peer-to-peer network, that is, a new wireless communication environment. In other words, it is impossible to apply the centralized secret key distribution method to a wireless communication environment because the wireless communication environment is not centrally controlled. Therefore, a new key generation method is required to replace the centralized secret key distribution method.

Meanwhile, in a wireless communication network, correlated random sources that provide an absolute secret can be obtained from the information about a wireless channel. In particular, if a wireless communication system uses a Time Division Duplex (TDD) method two users A and B who have set up a communication link between themselves can each obtain information about the same wireless channel within a specific time. In contrast, an infiltrator who has not set up a wireless link with the users A and B monitors the status of a wireless channel which rarely has a correlation with the wireless channel of the two users.

The two users may generate secret keys using information about the wireless channel which is monitored at a specific time interval by applying this difference to the generation of the secret keys. This key generation method is advantageous in that the center does not need to distribute or generate a key because an entity that performs communication generates a secret key by itself.

The method of generating a secret key using a wireless channel has been proposed as a method by which users who perform wireless communication generate secret keys based on a channel impulse response which is naturally generated in a communication link. These methods are problematic in that they deteriorate the randomness of a secret key and reduce the key generation speed because the status of a wireless channel does not change rapidly when a user is not moving.

SUMMARY OF THE INVENTION

Accordingly, the present invention has been made keeping in mind the above problems occurring in the prior art, and an object of the present invention is to provide an apparatus and method for generating a secret key using a change in a wireless channel on a wireless communication network, which change the phase and amplification gain of a wireless channel regardless of the rate of change in the wireless channel, transmit and receive signals, and generate a secret key based on a received signal.

In order to accomplish the above object, the present invention provides a secret key generation apparatus, including an at least one antenna configured to receive a wireless signal from a counterpart terminal that performs wireless communication amplification/phase controllers configured to control amplification gain and phase of the wireless signal that is received via at least one antenna; a transceiver configured to measure status of a wireless channel using the wireless signal having the controlled amplification gain and phase, to determine parameters based on results attic measurement, and generate a secret key based on results of the determination; and a random signal controller configured to control the amplification/phase controllers so that the amplification gain and phase are adjusted whenever the transceiver generates a secret key.

The transceiver may include a transmission/reception controller configured to perform control so that the secret key generation apparatus operates in transmitter mode or receiver mode; and a key generation controller configured to control the parameters that are used to generate the secret key.

The transceiver may further include a receiver configured to generate the secret key using the wireless signal having the controlled amplification gain and phase when receiver mode is set by a switch that is controlled by the transmission/reception controller.

The receiver may include a wireless channel information collection unit configured to receive the wireless signal having the controlled amplification gain and phase via the switch; a sample collection unit configured to extract information about the wireless channel including the amplification gain and phase by applying the wireless signal having the controlled amplification gain and phase to a predetermined sampling rate, and to generate quantization information by performing a quantization process; a wireless channel estimation unit configured to estimate a change in the wireless channel using the information about the wireless channel; and a key generation unit configured to generate the secret key using the quantization information.

The transceiver may further include a transmitter configured to send the wireless signal via the at least one antenna when the transmitter mode is set by a switch that is controlled by the transmission/reception controller.

The key generation controller may determine whether to perform key pairing that determines whether the secret key or a hash value derived from the secret key is identical with a secret key or a hash value generated by the counterpart terminal, and control the parameters based on the results of the key pairing.

The transceiver may further include a key exchange information collection unit configured to collect and store the results of the key pairing when the key generation controller performs the key pairing.

In order to accomplish the above object, the present invention provides a secret key generation method, including performing frame synchronization with a counterpart terminal that performs wireless communication; receiving a wireless signal from the counterpart terminal, and measuring long-period wireless channel status from the wireless signal; determining parameters to be used to generate a secret key while taking into consideration the long-period wireless channel status; changing a wireless channel response by controlling amplification gain and phase of the wireless signal, and measuring short-period wireless channel status based on the changed wireless channel response; and generating the secret key using the parameters in the short-period wireless channel status.

The secret key generation method may further include determining whether to perform key pairing that determines whether the secret key or a hash value derived from the secret key is identical with a secret key or a hash value generated by the counterpart terminal.

The determining whether to perform the key pairing may include receiving the secret key or the hash value generated by the counterpart terminal; if as a result of the determination, it is determined that the secret key or the hash value derived from the secret key is identical with the secret key or the hash value generated by the counterpart terminal, generating key determination information to provide notification that the secret key has been determined; and transferring the key determination information to the counterpart terminal.

The determining whether to perform the key pairing may include if, as a result of the determination, it is determined that the secret key or the hash value derived from the secret key is not identical with the secret key or the hash value generated by the counterpart terminal, generating key mismatch information to provide notification that the secret key or the hash value derived from the secret key is not identical with the secret key or the hash value generated by the counterpart terminal; and transferring the key mismatch information to the counterpart terminal.

The transferring the key mismatch information to the counterpart terminal may include generating a secret key again by controlling the parameters using a predetermined error processing method.

The generating the secret key may include controlling the amplification gain and phase in a key generation cycle, with synchronization of the amplification gain and phase being fixed whenever a secret key is generated.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
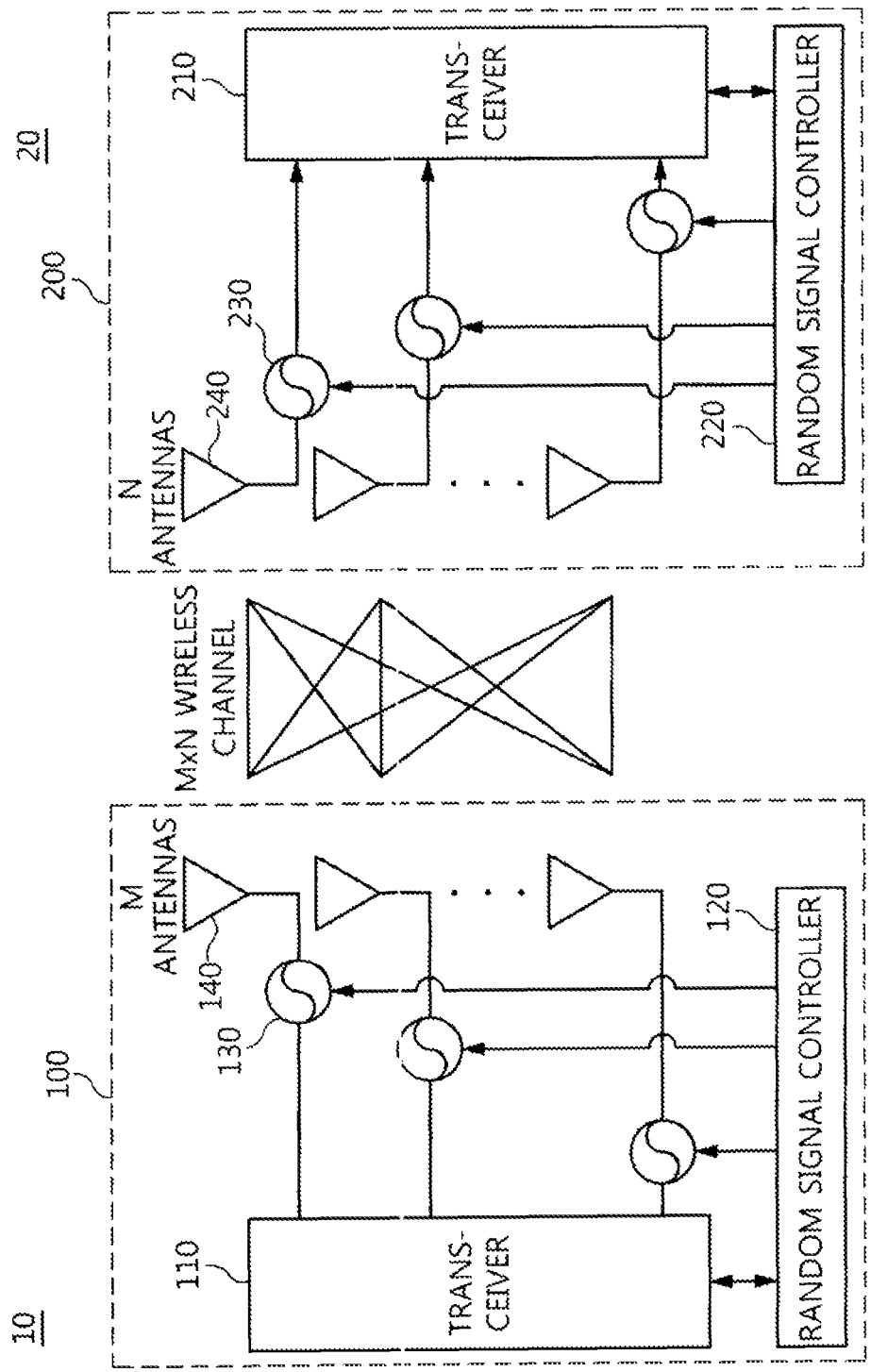
FIG. 1 is a diagram schematically showing a secret key generation apparatus for generating a secret key by changing the phase and amplification of a wireless communication channel according to an embodiment of the present invention.

The present invention will be described in detail below with reference to the accompanying drawings. Repeated descriptions and descriptions of known functions and constructions which have been deemed to make the gist of the present invention unnecessarily vague will be omitted below. The embodiments of the present invention are provided in order to fully describe the present invention to a person having ordinary skill in the art. Accordingly, the shapes, sizes, etc. of elements in the drawings may be exaggerated to make the description clear.

FIG. 1 is a diagram schematically showing a secret key generation apparatus for generating a secret key by changing the phase and amplification of a wireless communication channel according to an embodiment of the present invention. Although the generation of a secret key according to an embodiment of the present invention may be applied to two or more terminals, FIG. 1 shows a configuration in which each of two terminals each including multiple antennas changes the phase and amplification of a wireless channel and generates a secret key using information about the changed wireless channel.

As shown in FIG. 1, a terminal 10 being used by a user A and a terminal 20 being used by a user B according to an embodiment of the present invention operate in transmitter mode or receiver mode, and include secret key generation apparatuses 100 and 200, respectively, having the same structure. Each of the secret key generation apparatuses generates a secret key using the information about a changed wireless channel when the corresponding terminal operates in receiver mode.

When the terminal 10 being used by the user A is set to transmitter mode, the transceiver 110 of the secret key generation apparatus 100 generates an agreed transmission signal. The random signal controller 120 of the secret key generation apparatus 100 controls amplification/phase controllers 130. The phase and amplification of the transmission signal are controlled by the amplification/phase controllers 130, and then the transmission signal is transmitted via M multiple antennas 140.

Meanwhile, when the terminal 20 being used by the user B is set to receiver mode, a signal transmitted by the terminal 10 is received via N multiple antennas 240. The random signal controller 220 of the secret key generation apparatus 200 controls amplification/phase controllers 230 whenever generating a secret key so that the phase and gain of the received signal are controlled in order to improve the similarity and randomness of the secret key. The amplification/phase controllers 230 control the phase and gain of the received signal under the control of the random signal controller 220, and transfer the resulting signal to the secret key generation apparatus 200.

When the random signal controller and the amplification/phase controllers having the same structures as described above am combined with the transceiver, the size and cost of the circuits can be reduced.

Figure 2:
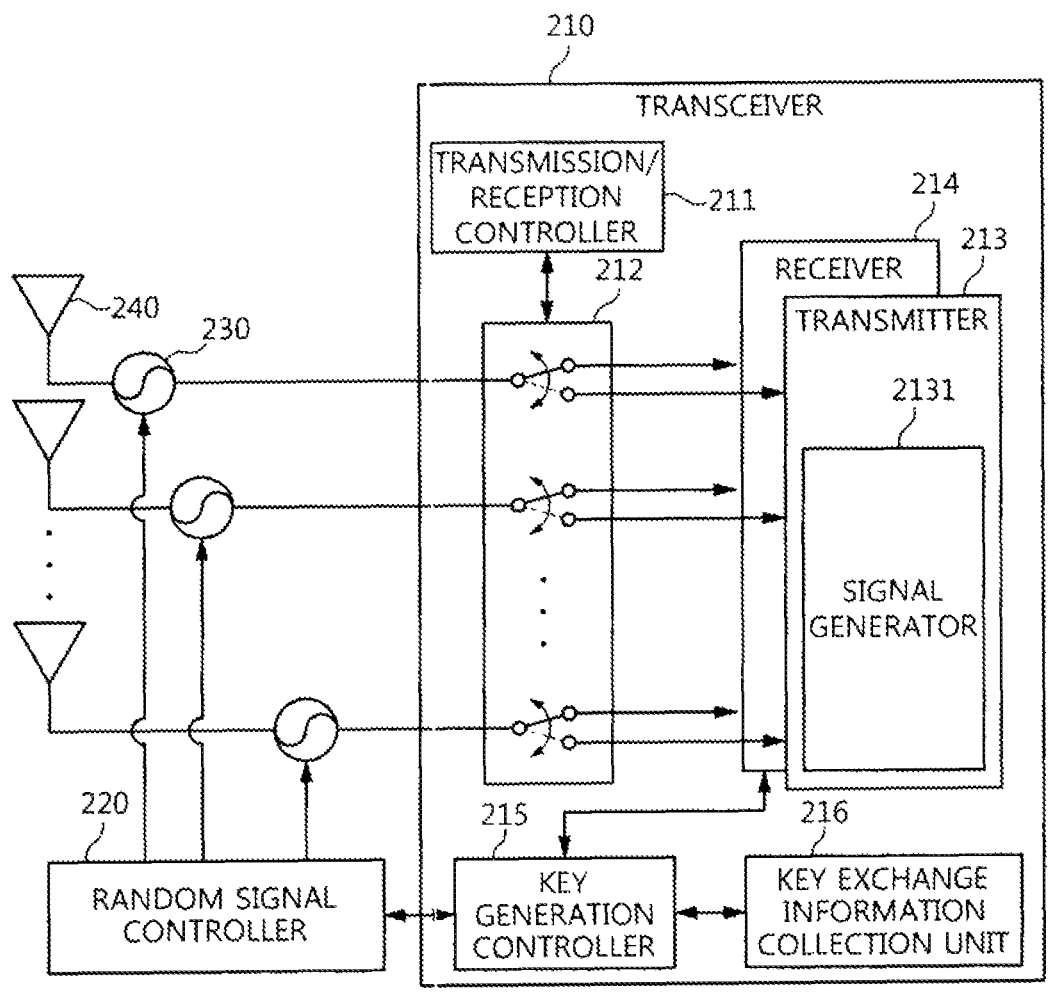
FIG. 2 is a diagram schematically showing the structure of the transceiver of the secret key generation apparatus according to an embodiment of the present invention.
Figure 3:
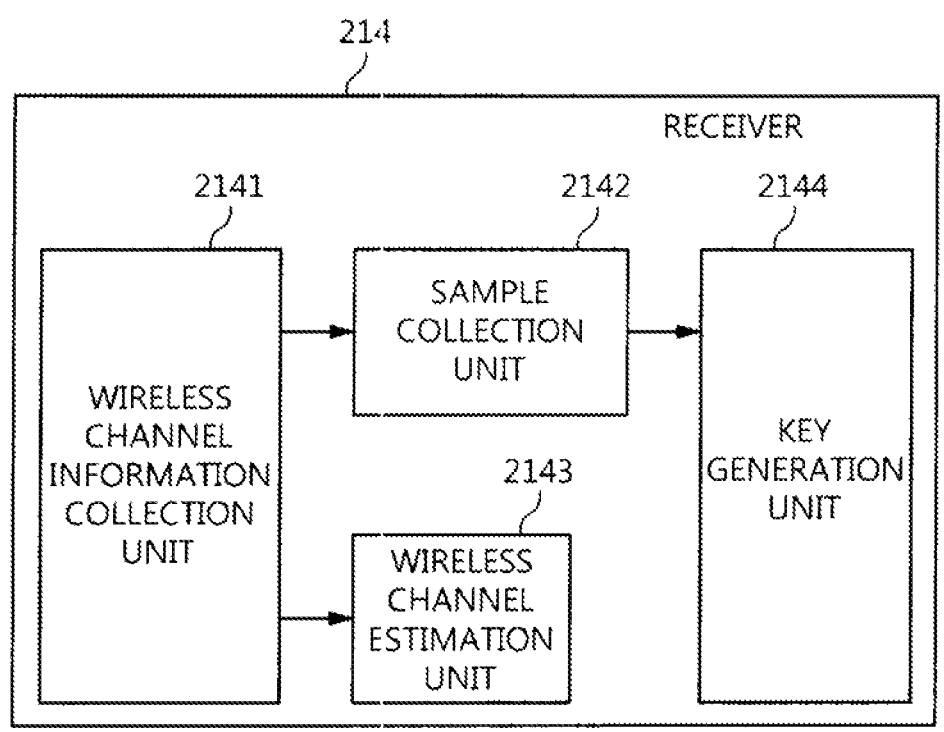
FIG. 3 is a diagram schematically showing a receiver shown in FIG. 2.

FIG. 2 is a diagram schematically showing the structure of the transceiver of the secret key generation apparatus according to an embodiment of the present invention, and FIG. 3 is a diagram schematically showing the receiver shown in FIG. 2.

As shown in FIG. 2, since the transceivers of the secret key generation apparatuses 100 and 200 according to the embodiment of the present invention have the same structure, the transceiver 210 of the secret key generation apparatus 200 will be described in detail below.

The transceiver 210 includes a transmission/reception controller 211, a switch 212, a transmitter 213, a receiver 214, a key generation controller 215, and a key exchange information collection unit 216.

The transmission/reception controller 211 controls the switch 212 so that the secret key generation apparatus 200 may be selectively set to transmitter mode and receiver mode. That is, if it is desired to operate the secret key generation apparatus 200 in transmitter mode, the transmission/reception controller 211 performs control so that the switch 212 is connected to the transmitter 213. Furthermore, if it is desired to operate the secret key generation apparatus 200 in receiver mode, the transmission/reception controller 211 performs control so that the switch 212 is connected to the receiver 214.

The switch 212 is connected to the transmitter 213 or the receiver 214 under the control of the transmission/reception controller 211.

The transmitter 213 includes a signal generator 2131. When the transmitter 213 has been connected to the switch 212 so that transmitter mode has been set, the transmitter 213 sends a wireless signal to the multiple antennas 240. That is, if the secret key generation apparatus 200 is operating in transmitter mode, the signal generator 2131 sends a previously agreed signal to each of the multiple antennas 240 via the random signal controller 220.

When the receiver 214 has been connected to the switch 212 so that receiver mode has been set, the receiver 214 receives a wireless signal via the multiple antennas 240 and generates a secret key.

More specifically, referring to FIGS. 2 and 3, the receiver 214 includes a wireless channel information collection unit 2141, a sample collection unit 2142, a wireless channel estimation unit 2143, and a key generation unit 2144.

The wireless channel information collection unit 2141 receives a wireless signal, that is, wireless channel analog information, received via the multiple antennas 240, via the random signal controller 220. The wireless channel information collection unit 2141 transfers the wireless signal to the sample collection unit 2142.

The sample collection unit 2142 receives the wireless signal from the wireless channel information collection unit 2141, and extracts information about a wireless channel, including the amplification gain and phase of the wireless signal, from the wireless signal by applying the wireless signal to a set sampling rate. The sample collection unit 2142 transfers the extracted information about the wireless channel to the wireless channel estimation unit 2143. Furthermore, the sample collection unit 2142 extracts quantization information from the wireless signal by performing a quantization process on the wireless signal using a set quantization level function. The sample collection unit 2142 transfers the extracted quantization information to the key generation unit 2144.

The wireless channel estimation unit 2143 receives the information about the wireless channel from the sample collection unit 2142. Furthermore, the wireless channel estimation unit 2143 estimates a future change in the wireless channel using the information about the wireless channel. The wireless channel estimation unit 2143, with the key generation controller 215 and the random signal controller 220, shares a rate of change in the wireless channel based on information about past and current wireless channels and information about the estimated wireless channel.

The key generation unit 2144 receives the quantization information from the sample collection unit 2142 and generates a secret key using the received quantization information. Here, speed and a key generation function, that is parameters used in the generation of the secret key, are controlled by the key generation controller 215.

Referring back to FIG. 2, when receiver mode has been set, the key generation controller 215 controls the parameters used to generate a secret key by controlling the key generation unit 2144 of the receiver 214. Here, the parameters include the length of the secret key, a sampling rate (i.e., the number of samples per unit time), a key generation cycle (i.e., an amplification gain and a phase change cycle), and a quantization level (i.e., the size of a unit generation secret key). Furthermore, the key generation controller 215 determines whether key pairing is required.

Key pairing is the process of comparing one's own secret key (hereinafter used interchangeably with a "generation key") with a counterpart secret key and then determining whether to use the generation key. The key pairing process is performed when a generation key is not identical with a counterpart secret key or when it is required to check a secret key directly. Here, whether the generation key and the counterpart secret key are identical with each other may be determined by sending a generation key at an agreed time to a counterpart terminal. Furthermore, in the key pairing process, keys may be exchanged using exchange algorithms, such as the Diffie-Hellman key exchange algorithm, in order to prevent the keys from being exposed to the outside. In addition, whether the generation keys of two users are identical with each other may be determined by sending hash values derived from the generation keys, instead of the generation keys.

The key exchange information collection unit 216 collects the results of the key pairing performed by the key generation controller 215, and stores the collected results.

A process in which the secret key generation apparatus 100 of the terminal 10 being used by the user A and the secret key generation apparatus 200 of the terminal 20 being used by the user B generates secret keys in receiver mode according to an embodiment of the present invention will be described in detail below. Assuming that the phase is a randomly generated phase $e^{jw\Phi} = \phi_i$ and, that when each of two users A and B uses multiple antennas, a wireless channel generated by a pair of antennas i and j of the users A and B is $h_{ij}$, an antenna phase and an amplification gain randomly generated by the i-th antenna of the user A are $\Phi_{Ai}$ and $g_{Ai}$, an antenna phase and an amplification gain randomly generated by the j-th antenna of the user B are $\Phi_{Bj}$ and $g_{Bj}$, and pieces of noise received by the two users A and B are $n_A$ and $n_B$, the sums $r_A$ and $r_B$ of the intensities of respective reception signals collected by the wireless channel information collection units 2141 of the secret key generation apparatuses 100 and 200 of the two users A and B are expressed by the following Equation 1:

$$r_A = \sum_{i=1...m} \left[ \left( \sum_{j=1...n} h_{ij} \cdot g_{B_j} \cdot \phi_{B_j} \right) \cdot g_{A_i} \cdot \phi_{A_i} \right] + n_A \quad (1)$$

$$r_B = \sum_{j=1...n} \left[ \left( \sum_{i=1...m} h_{ij} \cdot g_{A_i} \cdot \phi_{A_i} \right) \cdot g_{B_j} \cdot \phi_{B_j} \right] + n_B$$

If the pieces of noise $n_A$ and $n_B$ received by the two users A and B are small, the state $r_A \approx r_B$ is brought about, and thus the reception signal intensifies that the two users A and B can obtain are similar.

In other to reduce the influence of pieces of noise received by the two users A and B, a reception apparatus for reducing reception noise by summing signals received via the multiple antennas, increasing the number of samples $\Sigma r_A$ to be used to generate a secret key, or minimizing reception noise, such as an LNA, may be used.

During the above-described key generation cycle, when the secret key generation apparatus 200 of the terminal 20 operating in receiver mode collects a predetermined number of samples and determines a reception signal based on the predetermined number of samples, the secret key generation apparatus 200 of the terminal 20 normalizes the intensity of the reception signal because the average reception signal may affect the generation of a secret key. That is, the secret key generation apparatus 200 generates a secret key by applying a predetermined quantization method to value $r_A/\overline{r_A}$ that is obtained by dividing the intensity $r_A$ of the reception signal by the average intensity $\overline{r_A}$ of the reception signal of the user A. Furthermore, the secret key generation apparatus 200 may directly use the secret key to perform encryption and decryption, or may perform encryption and decryption using the value of the secret key as the seed value of password operation mode.

Figure 4:
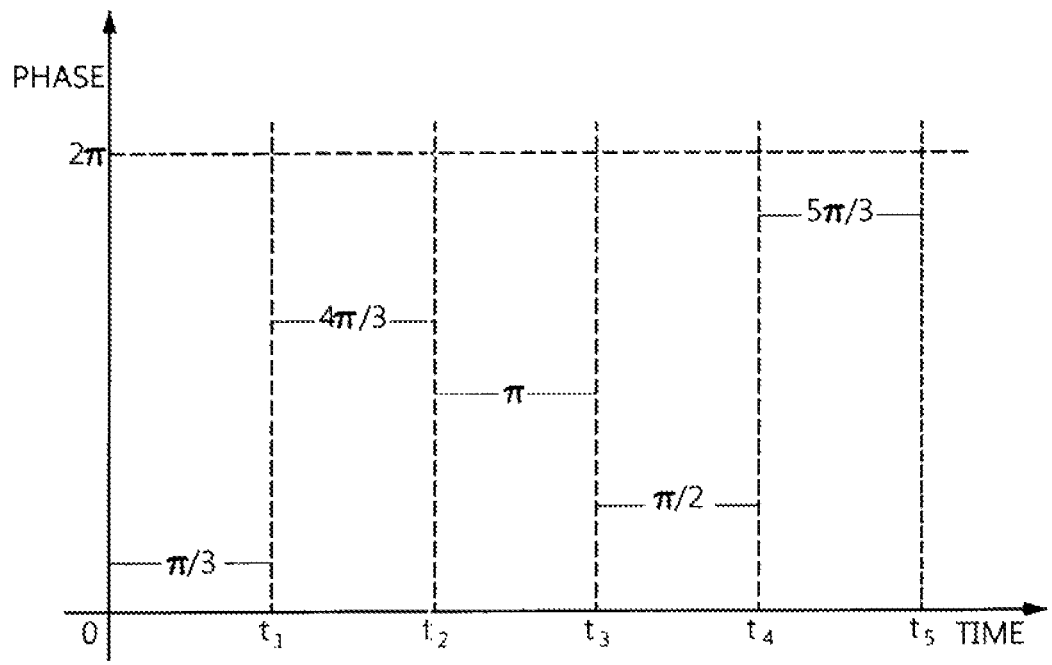
FIG. 4 is a graph showing an example in which the amplification/phase controllers of the secret key generation apparatus shown in FIG. 2 change phase.
Figure 5:
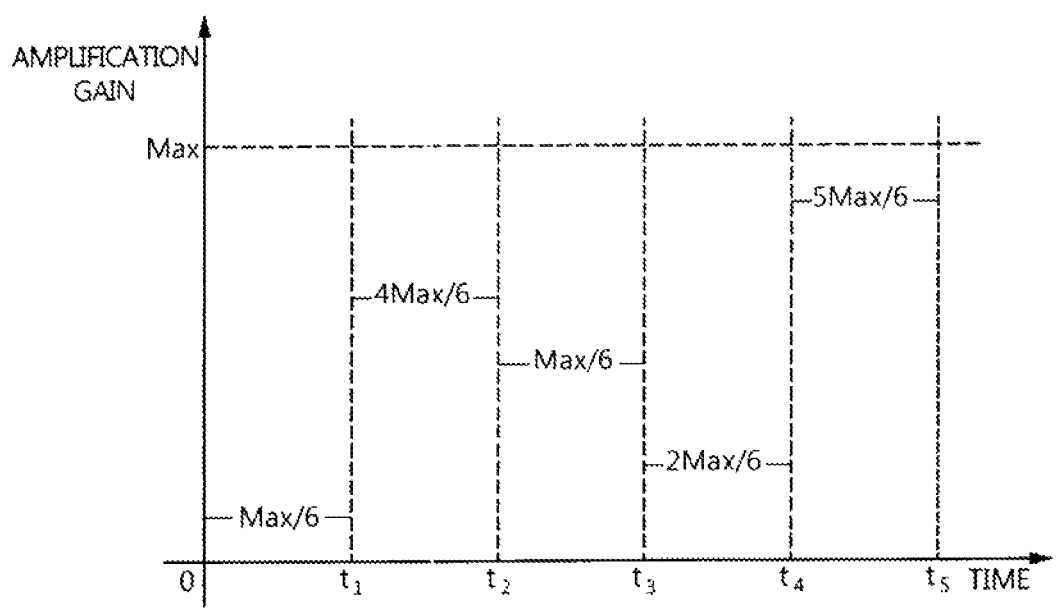
FIG. 5 is a graph showing an example in which the amplification/phase controllers of the secret key generation apparatus shown in FIG. 2 change amplification gain.

FIG. 4 is a graph showing an example in which the amplification/phase controllers of the secret key generation apparatus shown in FIG. 2 change phase, and FIG. 5 is a graph showing an example in which the amplification/phase controllers of the secret key generation apparatus shown in FIG. 2 change the amplification gain.

Referring to FIG. 4, the amplification/phase controllers 230 of the secret key generation apparatus 200 according to an embodiment of the present invention change the phase of a signal under the control of the random signal controller 220 when there is a change in the phase of the signal, and display the changed phase. For example, when the phase is changed from at π/3 in interval 0–t1 to 4π/3 in the interval t1-t2, the amplification/phase controllers 230 change the phase into a phase corresponding to 4π/3. In the same manner, when the phase is changed to π in interval t2-t3, the amplification/phase controllers 230 change the phase into a phase corresponding to π. In the same manner, the amplification/phase controllers 230 change the phase in accordance with changes over the remaining interval (t3-t5), and display the changed phases.

Meanwhile, referring to FIG. 5, when there is a change in the amplification gain, the amplification/phase controllers 230 change the amplification gain and display the changed amplification gain. When the maximum amplification gain is fixed to Max and then the amplification gain is changed from Max/6 in interval (0–t1) to 4 Max/6 in interval (t1-t2), the amplification/phase controllers 230 change the amplification gain to an amplification gain corresponding to 4 Max/6 and display the changed amplification gain. In the same manner, when the phase in the time t2-t3 is changed into Max/2, the amplification/phase controllers 230 change the phase to an amplification gain corresponding to Max/2 and display the changed amplification gain. In the same manner, the amplification/phase controllers 230 change the amplification gain in accordance with changes over the remaining interval (t3-t5), and display the changed amplification gains.

Figure 6:
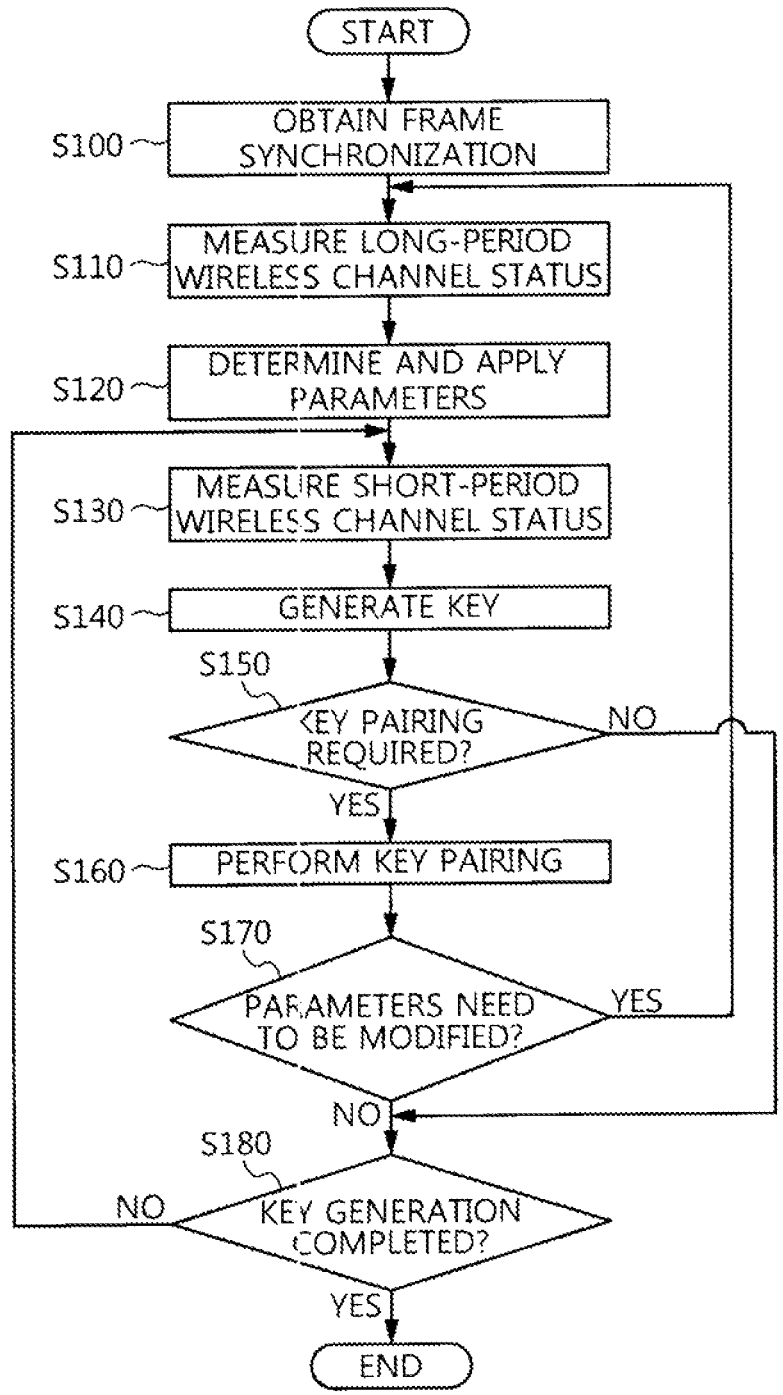
FIG. 6 is a flowchart illustrating a process in which the secret key generation apparatus generates a secret key according to an embodiment of the present invention.

FIG. 6 is a flowchart illustrating a process in which the secret key generation apparatus generates a secret key according to an embodiment of the present invention. In FIG. 6, it is assumed that the terminal 10 of the user A using the multiple antennas operates as a transmitter, the terminal 20 of the user B operates as a receiver, and then they generate secret keys.

Refining to FIGS. 1 and 6, in the embodiment of the present invention, in order to initialize the terminal 10 transmitting a signal and the terminal 20 receiving a signal to an initialization process of generating a secret key, a counterpart's frame synchronization is obtained and the frames of the secret key generation apparatus 100 of the terminal 10 and the secret key generation apparatus 200 of the terminal 20 are synchronized at step S100.

The secret key generation apparatus 100 of the terminal 10 operates in transmitter mode, and sends a wireless signal including a pilot signal. Here, in the case of an OFDM system, a wireless signal in which a pilot signal is distributed over a frequency subcarrier in a predetermined pattern is transmitted via the multiple antennas. In the case of a CDMA system, a wireless signal in which an orthogonal code is allocated to the pilot signal is transmitted via the multiple antennas.

Thereafter, the secret key generation apparatus 200 of the terminal 20 operating in reception mode receives the wireless signal including the pilot signal and measures the status of a long-period wireless channel (hereinafter referred to as "long-period wireless channel status") from the received wireless signal at step S110. More specifically, the secret key generation apparatus 200 measures the current wireless channel status, monitors the wireless channel status over a long period, and then measures the long-period wireless channel status. The secret key generation apparatus 200 estimates a coherence time and a frequency in order to measure the long-period wireless channel status.

The secret key generation apparatus 200 determines parameters to be used to generate a secret key while referring to the coherence time and frequency estimated from the long-period wireless channel status and a Signal to Noise Ratio (hereinafter referred to as an "SNR") at step S120.

For example, when the intensity of the SNR is high, the secret key generation apparatus 200 may reduce the sampling rate or the key generation cycle, or increase a quantization level in order to increase the key generation speed.

In contrast, when the intensity of the SNR is low, the secret key generation apparatus 200 may increase the sampling rate or the key generation cycle, or reduce the quantization level in order to lower the generation key error rate indicative of the probability of generating another secret key between the terminals. Here, in order to maintain similar wireless channel status between the terminals, the coherence tune during which the secret key is generated must be longer than the length of the key generation cycle.

As another example, the parameters may be determined based on an average SNR between the terminals. Furthermore, if average wireless channel status is changed, the parameters may be reset based on the changed SNR value.

In the above-described process of determining the parameters, one of the two terminals may function as the master and play a leading role in determining the parameters. Alternatively, the terminals may share information about a wireless channel and determine the parameters via negotiation.

After the parameters to be used to generate a secret key have been determined in the long-period wireless channel status at step S120, the secret key generation apparatus 200 changes a wireless channel response by controlling the phase and amplification gain of the signal at a specific interval and measures short-period wireless channel status at step S130. Furthermore, the secret key generation apparatus 200 generates a secret key using the length of the secret key, the sampling rate, and a quantization method that are determined in the short-period wireless channel status at step S140. That is, the secret key generation apparatus 200 generates the secret key by controlling the phase and amplification gain of the signal in the key generation cycle, with the synchronization of the amplification gain and phase being fixed whenever the secret key is being generated.

After the generation of the secret key has completed as described above, each of the users uses the generation key directly to perform encryption and decryption, or uses the generation key as the seed value in password operation mode. Furthermore, if desired, whether key pairing with a counterpart terminal is required is determined at step S150.

If, as a result of the determination at step S150, it is determined that the key pairing with the counterpart terminal is requited, the secret key generation apparatus 200 performs the key pairing that determines whether the generation key is identical with the secret key of the counterpart terminal at step S160.

The secret key generation apparatus 200 determines whether it is necessary to control the parameters based on the results of the key pairing at step S170.

If as a result of the determination at step S170, it is determined that it is necessary to control the parameters, the secret key generation apparatus 200 returns to step S110, at which the secret key generation apparatus 200 resets the parameters by monitoring long-period wireless channel information. If as a result of the determination at step S170, it is determined that it is not necessary to control the parameters, the secret key generation apparatus 200 determines whether the secret key has been sufficiently generated at step S180.

If as a result of the determination at step S180, it is determined that the secret key has not been adequately generated, the secret key generation apparatus 200 returns to step S130, at which the secret key generation apparatus 200 measures short-period wireless channel status. If, as a result of the determination at step S180, it is determined that the secret key has been adequately generated, the secret key generation apparatus 200 terminates the process of generating a secret key.

Figure 7:
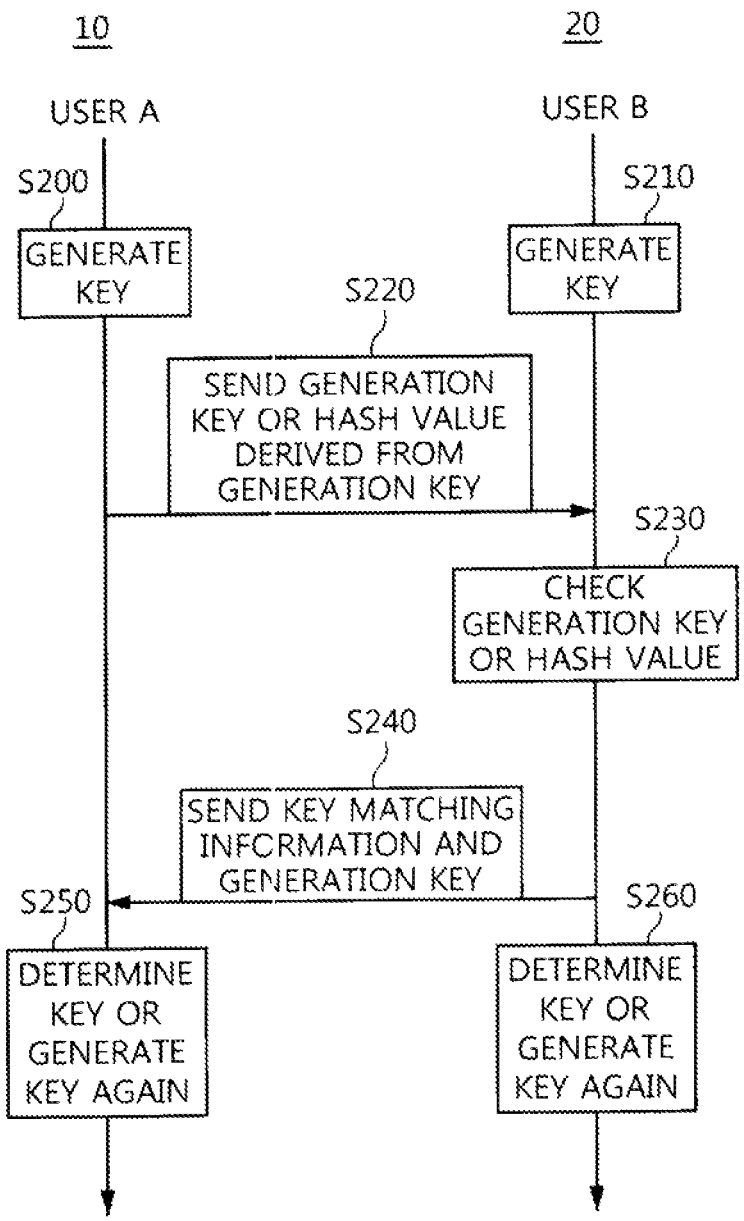
FIG. 7 is a diagram showing a pairing process for generation keys according to an embodiment of the present invention.

FIG. 7 is a diagram showing a pairing process for generating keys according to an embodiment of the present invention. In FIG. 7, the wireless communication of the terminals of the two users is carried out in TDD mode or in similar mode, and the same wireless frequency is alternately switched to transmitter mode or receiver more over time depending on the structure of the transceiver of FIG. 2.

As shown in FIG. 7, the secret key generation apparatus 100 of the user A using the multiple antennas and the secret key generation apparatus 200 of the user B using the multiple antennas according to the embodiment of the present invention generate respective secret keys by performing sampling and quantization processes using information about the wireless channel received via the multiple antenna at steps S200 and S210.

Furthermore, one of the two users sends the generation key or a hash value derived from the generation key in a predetermined order. Here, it is assumed that the user A first sends the generation key or a hash value derived from the generation key to the terminal of the user B.

Once the secret key generation apparatus 100 of the user A has sent the generation key or the hash value derived from the generation key to the secret key generation apparatus 200 of the user B at step S220, the secret key generation apparatus 200 of the user B determines whether its own secret key or the hash value derived from the generation key is identical with the received generation key or the received hash value derived from the generation key and generates key matching information based on a result of the determination at step S230.

The secret key generation apparatus 200 of the user B sends its own secret key and the key matching information to the secret key generation apparatus 100 of the user A at step S240.

Each of the secret key generation apparatuses 100 and 200 of the user A and the user B determines whether its own generation key or a hash value derived from the generation key is identical with the generation key or hash value of the counterpart, and determines that its own generation key or the hash value is a secret key it as a result of the determination, it is determined that the former generation key or hash value is identical with the latter generation key or hash value.

If, as a result of the determination, it is determined that the former generation key or hash value is not identical with the latter generation key or hash value, each of the secret key generation apparatuses 100 and 200 repeats the above-described procedure or generates a secret key again by controlling the parameters based on the key error rate at steps S250 and S260.

Figure 8:
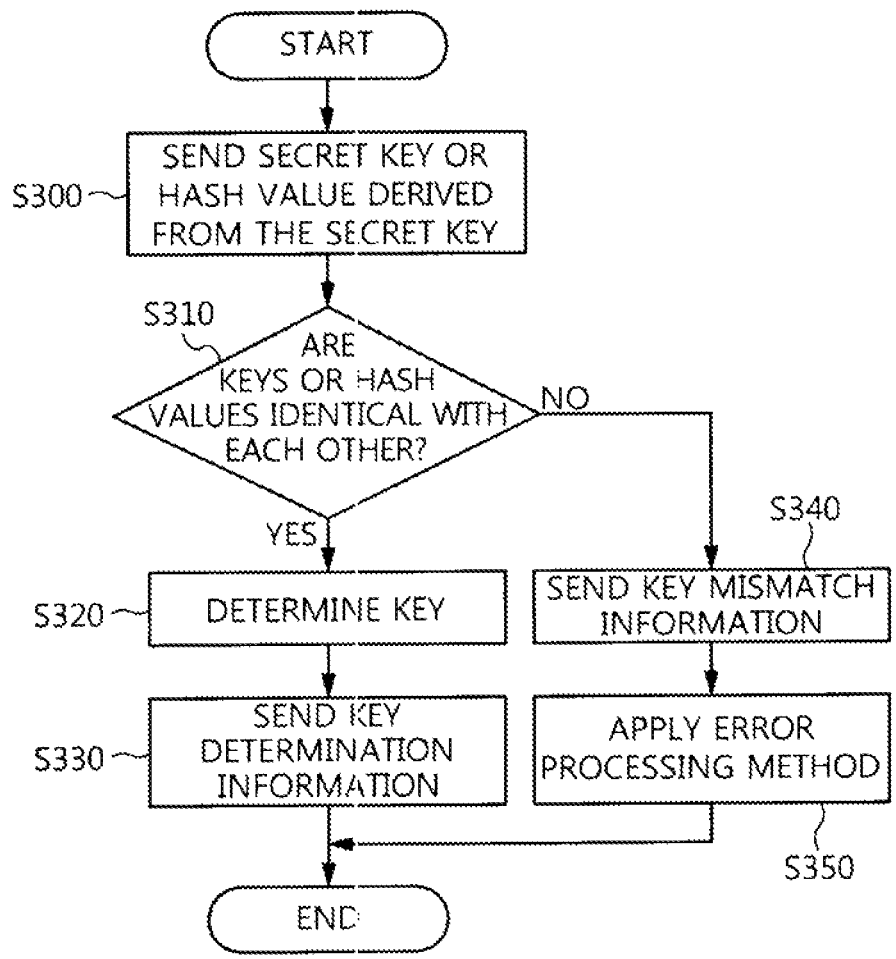
FIG. 8 is a flowchart illustrating in detail the process of performing the processing accompanying key matching in the key pairing process of FIG. 7.

FIG. 8 is a flowchart illustrating in detail the process of performing the processing accompanying key matting in the key pairing process of FIG. 7.

As shown in FIG. 8, the wet key generation apparatus 100 of the user A using the multiple antennas according to the embodiment of the present invention receives a secret key or a hash value derived from the secret key, which is generated by the user B via sampling and quantization processes using the information about a wireless channel at step S300.

The secret key generation apparatus 100 determines whether its own secret key is identical with the received secret key or whether its own hash value is identical with the received hash value at step S310.

If, as a result of the determination at step S310, it is determined that its own secret key is identical with the received secret key or its own hash value is identical with the received hash value, the secret key generation apparatus 100 determines that its own secret key or hash value is a secret key at step S320, generates key determination information in order to provide notification that the secret key has been determined, and sends the key determination information to the secret key generation apparatus 200 of the user B at step S330.

If, as a result of the determination at step S310, it is determined that its own secret key is identical with the received secret key or its own hash value is identical with the received hash value, the secret key generation apparatus 100 generates key mismatch information in order to provide notification that the keys do not match each other and sends the key mismatch information to the secret key generation apparatus 200 of the user B at step S340. The secret key generation apparatus 100 generates a secret key again by controlling the parameters at step S350.

As described above, in the embodiments of the present invention, the phase and amplification of a wireless communication channel are changed, signals are transmitted and received, and a secret key is generated based on a received signal. Accordingly, a secret key may be randomly generated regardless of the rate of change in the wireless channel of a terminal. As a result, even when a terminal stops or is moving at low speed, it is possible to generate a secret key while improving randomness.

Furthermore, in the embodiments of the present invention, multiple antennas are used, so that a maximum amount of information required to generate a secret key can be obtained via various wireless channels and then a secret key can be generated at high speed.

Furthermore, in the embodiments of the present invention, in the case where the same secret key is not generated because of a change in a wireless channel and reception noise, the key generation error rate can be reduced by controlling the parameters used to generate a secret key depending on the wireless channel status or by performing a key pairing process.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A secret key generation apparatus comprising:
at least one antenna configured to receive a wireless signal from a counterpart terminal that performs wireless communication;
amplification/phase controllers configured to control amplification gain and phase of the wireless signal that is received via the at least one antenna;
a transceiver configured to measure status of a wireless channel using the wireless signal having the controlled amplification gain and phase, to determine parameters based on results of the measurement, and generate a secret key based on results of the determination; and
a random signal controller configured to control the amplification/phase controllers so that the amplification gain and phase are adjusted whenever the transceiver generates a secret key,
wherein the transceiver comprises:
a transmission/reception controller configured to perform control so that the secret key generation apparatus operates in transmitter mode or receiver mode; and
a key generation controller configured to control the parameters that are used to generate the secret key, and
wherein the key generation controller determines whether to perform key pairing that determines whether the secret key or a hash value derived from the secret key is identical with a secret key or a hash value generated by the counterpart terminal, and controls the parameters based on results of the key pairing.

2. The secret key generation apparatus as set forth in claim 1, wherein the transceiver further comprises a receiver configured to generate the secret key using the wireless signal having the controlled amplification gain and phase when receiver mode is set by a switch that is controlled by the transmission/reception controller.

3. The secret key generation apparatus as set forth in claim 2, wherein the receiver comprises:
a wireless channel information collection unit configured to receive the wireless signal having the controlled amplification gain and phase via the switch;
a sample collection unit configured to extract information about the wireless channel including the amplification gain and phase by applying the wireless signal having the controlled amplification gain and phase to a predetermined sampling rate, and to generate quantization information by performing a quantization process;
a wireless channel estimation unit configured to estimate a change in the wireless channel using the information about the wireless channel; and
a key generation unit configured to generate the secret key using the quantization information.

4. The secret key generation apparatus as set forth in claim 1, wherein the transceiver further comprises a transmitter configured to send the wireless signal via the at least one antenna when the transmitter mode is set by a switch that is controlled by the transmission/reception controller.

5. The secret key generation apparatus as set forth in claim 1, wherein the transceiver further comprises a key exchange information collection unit configured to collect and store the results of the key pairing when the key generation controller performs the key pairing.

* * * * *